United States Patent
Shin et al.

(10) Patent No.: US 11,200,888 B2
(45) Date of Patent: Dec. 14, 2021

(54) ARTIFICIAL INTELLIGENCE DEVICE FOR PROVIDING SPEECH RECOGNITION FUNCTION AND METHOD OF OPERATING ARTIFICIAL INTELLIGENCE DEVICE

(71) Applicant: LG ELECTRONICS INC., Seoul (KR)

(72) Inventors: Wonho Shin, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 16/499,546

(22) PCT Filed: May 9, 2019

(86) PCT No.: PCT/KR2019/005593
§ 371 (c)(1),
(2) Date: Sep. 30, 2019

(87) PCT Pub. No.: WO2020/226213
PCT Pub. Date: Nov. 12, 2020

(65) Prior Publication Data
US 2021/0210073 A1    Jul. 8, 2021

(51) Int. Cl.
*G10L 15/00*     (2013.01)
*G10L 15/16*     (2006.01)
(Continued)

(52) U.S. Cl.
CPC ............ *G10L 15/16* (2013.01); *F25D 23/126* (2013.01); *G06N 3/08* (2013.01); *G10L 25/30* (2013.01); *G10L 2015/088* (2013.01)

(58) Field of Classification Search
CPC .......... F25D 2400/361; F25D 2600/06; G06F 21/32; G06N 3/004; G10L 15/26;
(Continued)

(56) References Cited

U.S. PATENT DOCUMENTS 9,406,297 B2 * 8/2016 Gardner ................ G10L 15/22
2007/0271512 A1 * 11/2007 Knight ..................... G06F 3/01
715/700
(Continued)

FOREIGN PATENT DOCUMENTS

KR   10-2015-0072603 A    6/2015
KR   10-2018-0126357 A   11/2018
(Continued)

OTHER PUBLICATIONS

V. Këpuska and G. Bohouta, "Improving Wake-Up-Word and General Speech Recognition Systems," 2017 IEEE 15th Intl Conf on Dependable, Autonomic and Secure Computing, 2017, pp. 318-321. (Year: 2017).*

(Continued)

*Primary Examiner* — Edgar X Guerra-Erazo
(74) *Attorney, Agent, or Firm* — Birch, Stewart, Kolasch & Birch, LLP (57) ABSTRACT

An artificial intelligence device for providing a speech recognition function includes a memory configured to store a basic wake-up word used to activate the speech recognition function of the artificial intelligence device and an additional wake-up word used to control operation of the artificial intelligence device, a microphone configured to receive a speech command, and a processor configured to determine whether a current situation is an additional wake-up word recognition situation when the basic wake-up word is recognized from the speech command and perform operation corresponding to the remaining command excluding the basic wake-up word from the speech command upon determining that the current situation is the additional wake-up word recognition situation.

11 Claims, 8 Drawing Sheets

(51) Int. Cl.
*F25D 23/12* (2006.01)
*G06N 3/08* (2006.01)
*G10L 25/30* (2013.01)
*G10L 15/08* (2006.01)

(58) Field of Classification Search
CPC . G10L 2015/223; G10L 15/22; G10L 15/285; G10L 15/04; G10L 15/05; G10L 2015/0636; G10L 2015/0638; G10L 17/02; G10L 17/04; G10L 17/18; G10L 17/22

See application file for complete search history.

(56) References Cited

U.S. PATENT DOCUMENTS

| | | | |
|---|---|---|---|
| 2009/0326957 A1* | 12/2009 | Yang | G10L 15/26 704/275 |
| 2015/0120294 A1* | 4/2015 | Gardner | G10L 15/26 704/235 |
| 2017/0169817 A1 | 6/2017 | VanBlon et al. | |
| 2019/0066680 A1 | 2/2019 | Woo et al. | |
| 2019/0348044 A1* | 11/2019 | Chun | G06F 21/32 |

FOREIGN PATENT DOCUMENTS

| KR | 10-2019-0022109 A | 3/2019 |
|---|---|---|
| KR | 10-2019-0041264 A | 4/2019 |

OTHER PUBLICATIONS

I. Stefanović, E. Nan and B. Radin, "Implementation of the wake word for smart home automation system," 2017 IEEE 7th International Conference on Consumer Electronics—Berlin (ICCE-Berlin), 2017, pp. 271-272. (Year: 2017).*

Li, C., Zhu, L., Xu, S., Gao, P., & Xu, B. (Aug. 2018). Recurrent Neural Network Based Small-footprint Wake-up-word Speech Recognition System with a Score Calibration Method. In 2018 24th International Conference on Pattern Recognition (ICPR) (pp. 3222-3227). IEEE. (Year: 2018).*

M. Wu et al., "Monophone-Based Background Modeling for Two-Stage On-Device Wake Word Detection," 2018 IEEE International Conference on Acoustics, Speech and Signal Processing (ICASSP), 2018, pp. 5494-5498. (Year: 2018).*

* cited by examiner

"hilg"
800

"hilg"      "stop"
800         1000

ARTIFICIAL INTELLIGENCE DEVICE FOR PROVIDING SPEECH RECOGNITION FUNCTION AND METHOD OF OPERATING ARTIFICIAL INTELLIGENCE DEVICE

CROSS REFERENCE TO RELATED APPLICATIONS

This application is the National Phase of PCT International Application No. PCT/KR2019/005593, filed on May 9, 2019, which is hereby expressly incorporated by reference into the present application.

TECHNICAL FIELD

The present invention relates to an artificial intelligence device and, more particularly, to an artificial intelligence device capable of recognizing a user's speech.

BACKGROUND ART

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

As more speech data is accumulated, speech recognition will be accurate, thereby achieving human parity.

In general, a speech recognition function of an artificial intelligence device is activated by a wake-up word to prepare to receive the additional speech of a user.

When a plurality of wake-up words is used, the capacity of the memory of the artificial intelligence device is limited or the amount of computation for recognizing the wake-up word increases. Therefore, only one wake-up word is generally used.

Accordingly, the artificial intelligence device receives an additional command after recognizing a wake-up word, and transmits the additional command to a natural language processing (NLP) server. The artificial intelligence device receives an intention corresponding to the additional command analyzed by the NLP server and performs operation according to the received intention.

However, in this case, since all additional commands are transmitted to the NLP server for speech control of the artificial intelligence device, delay may occur in a data exchange process with the NLP server. Therefore, even if operation needs to be immediately performed in response to the command of a user, the operation may be delayed, thereby causing user inconvenience.

DISCLOSURE

Technical Problem

An object of the present invention is to provide an artificial intelligence device capable of performing operation without delay by only simple utterance of a user in a specific situation.

Another object of the present invention is to provide an artificial intelligence device capable of efficiently using a memory of the artificial intelligence device and improving speech recognition performance.

Technical Solution

An artificial intelligence device according to an embodiment of the present invention includes a memory configured to store a basic wake-up word used to activate the speech recognition function of the artificial intelligence device and an additional wake-up word used to control operation of the artificial intelligence device, a microphone configured to receive a speech command, and a processor configured to determine whether a current situation is an additional wake-up word recognition situation when the basic wake-up word is recognized from the speech command and perform operation corresponding to the remaining command excluding the basic wake-up word from the speech command upon determining that the current situation is the additional wake-up word recognition situation.

A method of operating an artificial intelligence device for providing a speech recognition function includes storing a basic wake-up word used to activate the speech recognition function of the artificial intelligence device and an additional wake-up word used to control operation of the artificial intelligence device, receiving a speech command, determining whether a current situation is an additional wake-up word recognition situation when the basic wake-up word is recognized from the speech command, and performing operation corresponding to the remaining command excluding the basic wake-up word from the speech command, upon determining that the current situation is the additional wake-up word recognition situation.

Advantageous Effects

According to the embodiment of the present invention, as an additional wake-up word as well as a basic wake-up word is used for speech recognition in a specific situation, it is not necessary to transmit an operation command to an NLP server. Therefore, it is possible to rapidly perform operation through speech recognition without delay.

According to the embodiment of the present invention, since it is not necessary to store commands for controlling all operations of the artificial intelligence devices in a memory, it is possible to efficiently use the memory.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

The artificial intelligence device described in this specification may include cellular phones, smart phones, laptop computers, digital broadcast artificial intelligence devices, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the artificial intelligence device 100 described in this specification is applicable to stationary artificial intelligence devices such as smart TVs, desktop computers or digital signages.

In addition, the artificial intelligence device 100 according to the embodiment of the present invention is applicable to stationary or mobile robots.

In addition, the artificial intelligence device 100 according to the embodiment of the present invention may perform the function of a speech agent. The speech agent may be a program for recognizing the speech of a user and audibly outputting a response suitable to the recognized speech of the user.

The artificial intelligence device 100 may include a wireless communication unit 110, an input unit 120, a learning processor 130, a sensing unit 140, an output unit 150, an interface 160, a memory 170, a processor 180 and a power supply 190.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the artificial intelligence device 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input unit 123 receives information from a user. When information is received through the user input unit 123, The processor 180 may control operation of the artificial intelligence device 100 in correspondence with the input information.

The user input unit 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the artificial intelligence device or received, detected, sensed, generated or output in a predetermined manner or another manner by another component, device, artificial intelligence device or device for communicating with the artificial intelligence device.

The learning processor 130 may include a memory integrated with or implemented in the artificial intelligence device. In some embodiment, the learning processor 130 may be implemented using the memory 170.

Selectively or additionally, the learning processor 130 may be implemented using a memory related to the artificial intelligence device, such as an external memory directly coupled to the artificial intelligence device or a memory maintained in a server communicating with the artificial intelligence device.

In another embodiment, the learning processor 130 may be implemented using a memory maintained in a cloud computing environment or another remote memory accessible by the artificial intelligence device through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the artificial intelligence device or the processor 180 using any one of different types of data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the artificial intelligence device based on the generated information. To this end, the processor 180 may request, retrieve, receive or use the data of the processor 130 and control the artificial intelligence device to execute preferable operation or predicted operation of at least one executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module for enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the artificial intelligence device or a subset or superset thereof. In addition, each of the sub modules may provide various functions including vocabulary index, user data, a workflow model, a service model and an automatic speech recognition (ASR) system.

In another embodiment, the other aspects of the processor 180 or the artificial intelligence device may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the artificial intelligence device, in order to collect information for processing and storage from the learning processor 130.

Information collection may include sensing information through a sensor, extracting information stored in the memory 170, or receiving information from another artificial intelligence device, an entity or an external storage device through a communication unit.

The processor 180 may collect and store usage history information from the artificial intelligence device.

The processor 180 may determine the best match for executing a specific function using the stored usage history information and predictive modeling.

The processor 180 may receive or sense surrounding environment information or other information through the sensing unit 140.

The processor 180 may receive broadcast signals and/or broadcast related information, wireless signals or wireless data through the wireless communication unit 110.

The processor 180 may receive image information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the artificial intelligence device is determined based on data analysis and machine learning algorithms and techniques, the processor 180 may control the components of the artificial intelligence device in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile artificial intelligence device, the surrounding environment of the mobile artificial intelligence device, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile artificial intelligence device disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input unit 123 which provides an input interface between the artificial intelligence device 100 and the user.

The audio output module 152 is generally configured to output audio data received from the wireless communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

The interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The memory 170 stores data supporting various functions of the artificial intelligence device 100.

The memory 170 may store a plurality of application programs or applications executed in the artificial intelligence device 100, data and commands for operation of the artificial intelligence device 100, and data for operation of the learning processor 130 (e.g., at least one piece of algorithm information for machine learning).

The processor 180 generally controls overall operation of the artificial intelligence device 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the artificial intelligence device 100, in order to execute the application program.

The power supply 190 receives external power or internal power and supplies the appropriate power required to operate respective components included in the artificial intelligence device 100, under control of the controller 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 2:
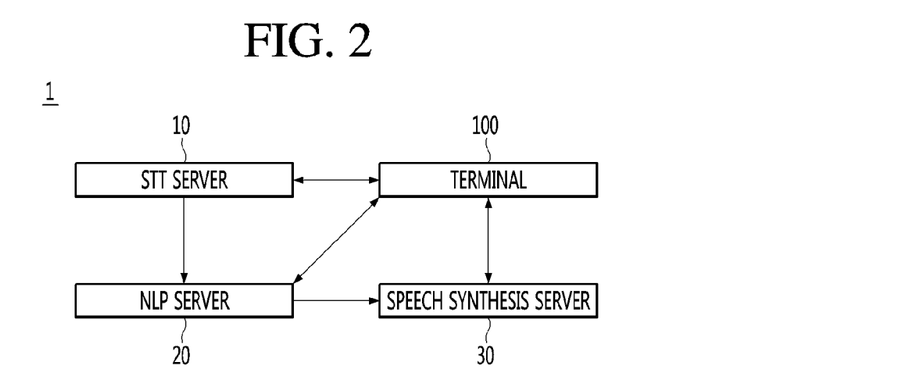
FIG. 2 is a diagram illustrating a speech system according to an embodiment of the present invention.

FIG. 2 is a diagram illustrating a speech system according to an embodiment of the present invention.

Referring to FIG. 2, the speech system 1 includes an artificial intelligence device 100, a speech-to-text (STT) server 10, a natural language processing (NLP) server 20 and a speech synthesis server 30.

The artificial intelligence device 100 may transmit speech data to the STT server 10.

The STT server 10 may convert the speech data received from the artificial intelligence device 100 into text data.

The STT server 10 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 10 may determine when the speech data is appropriately converted into the text data using the language model, thereby increasing accuracy of conversion into the text data.

The NLP server 20 may receive the text data from the STT server 10. The NLP server 20 may analyze the intention of the text data based on the received text data.

The NLP server 20 may transmit intention analysis information indicating the result of performing intention analysis to the artificial intelligence device 100.

The NLP server 20 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 20 may generate intention analysis information including at least one of the answer to, a response to, or a question about more information on the intention of the user's utterance, after the dialog processing step.

Meanwhile, the NLP server 20 may receive the text data from the artificial intelligence device 100. For example, when the artificial intelligence device 100 supports the speech-to-text conversion function, the artificial intelligence device 100 may convert the speech data into the text data and transmit the converted text data to the NLP server 20.

The speech synthesis server 30 may synthesize prestored speech data to generate a synthesized speech.

The speech synthesis server 30 may record the speech of the user selected as a model and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language and generate a synthesized speech corresponding to the translated text of the second language using the second speech language group.

The speech synthesis server 30 may transmit the synthesized speech to the artificial intelligence device 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as one server.

The respective functions of the STT server 10, the NLP server 20 and the speech synthesis server 30 may also be performed in the artificial intelligence device 100. To this end, the artificial intelligence device 100 may include a plurality of processors.

Figure 3:
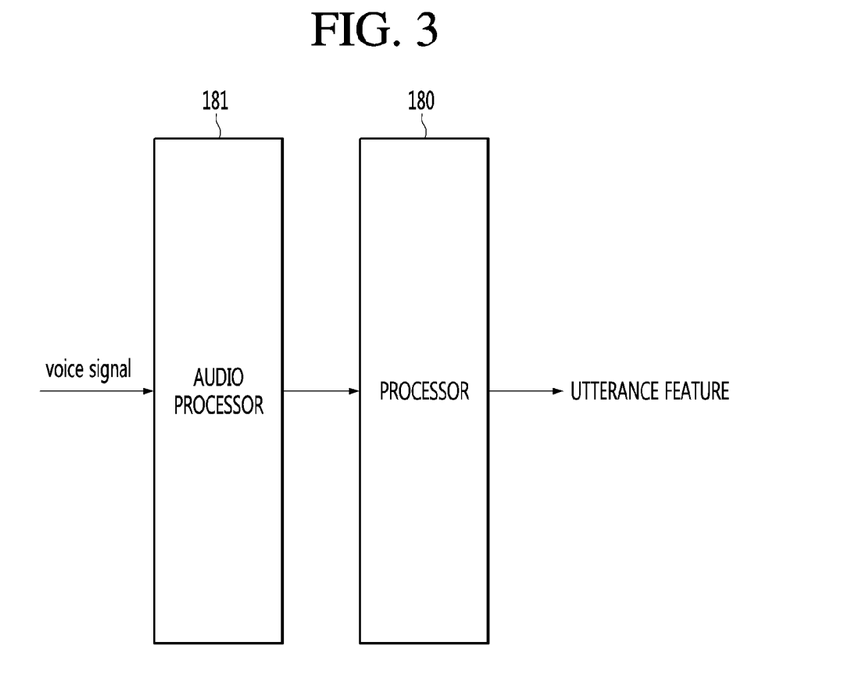
FIG. 3 is a diagram illustrating a process of extracting utterance features of a user from a speech signal according to an embodiment of the present invention.

FIG. 3 is a diagram illustrating a process of extracting utterance features of a user from a speech signal according to an embodiment of the present invention.

Figure 1:
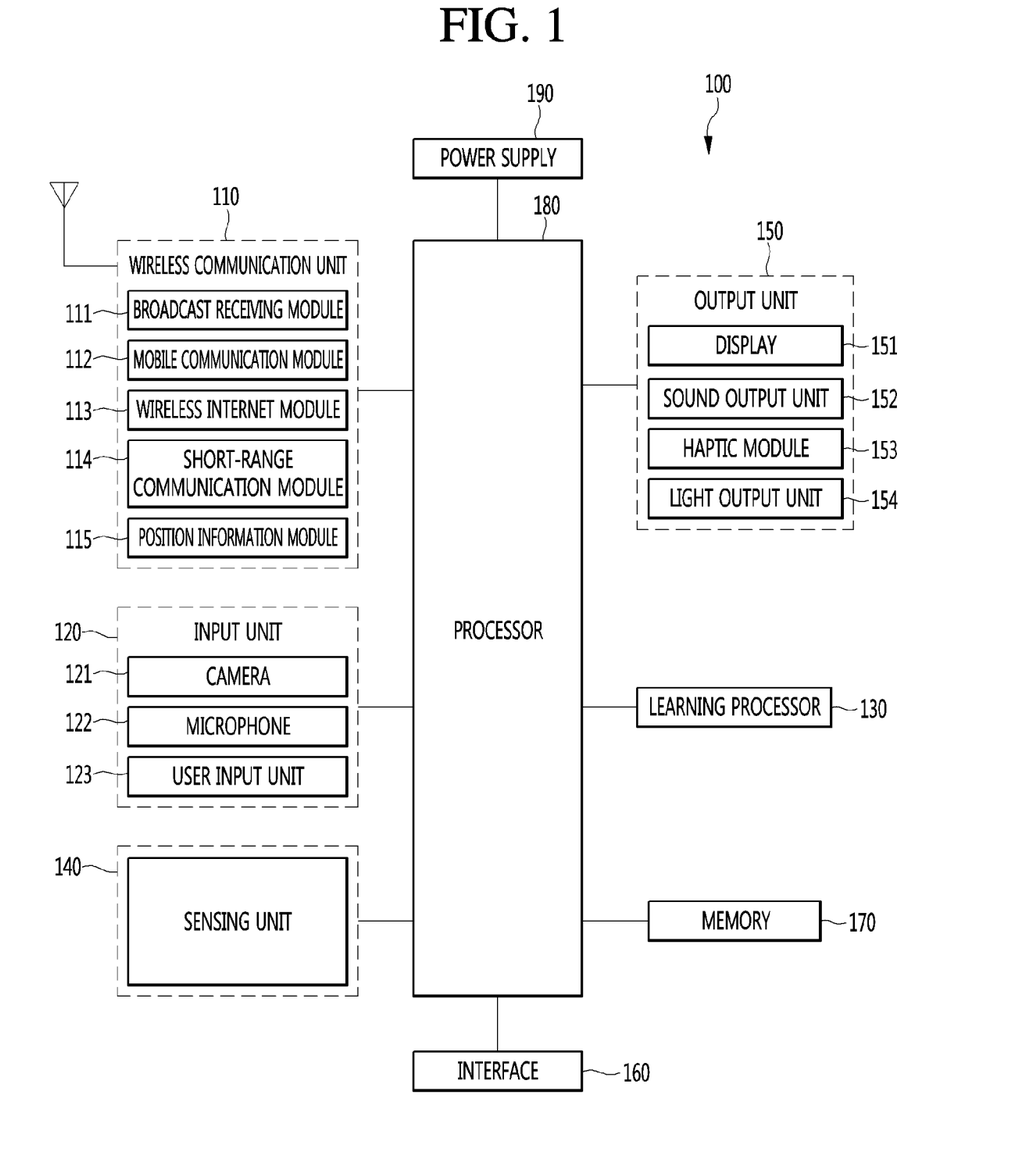
FIG. 1 is a block diagram illustrating an artificial intelligence device according to the present invention.

The artificial intelligence device 100 shown in FIG. 1 may further include an audio processor 181.

The audio processor 181 may be implemented as a chip separated from the processor 180 or a chip included in the processor 180.

The audio processor 181 may remove noise from the speech signal.

The audio processor 181 may convert the speech signal into text data. To this end, the audio processor 181 may include an STT engine.

The audio processor 181 may recognize a wake-up word for activating speech recognition of the artificial intelligence device 100. The audio processor 181 may convert the wake-up word received through the microphone 122 into text data and determine that the wake-up word is recognized when the converted text data corresponds to the prestored wake-up word.

The audio processor 181 may convert the speech signal, from which noise is removed, into a power spectrum.

The power spectrum may be a parameter indicating a frequency component included in the waveform of the speech signal varying with time, and a magnitude thereof.

The power spectrum shows a distribution of an amplitude squared value according to the frequency of the waveform of the speech signal.

This will be described with reference to FIG. 4.

Figure 4:
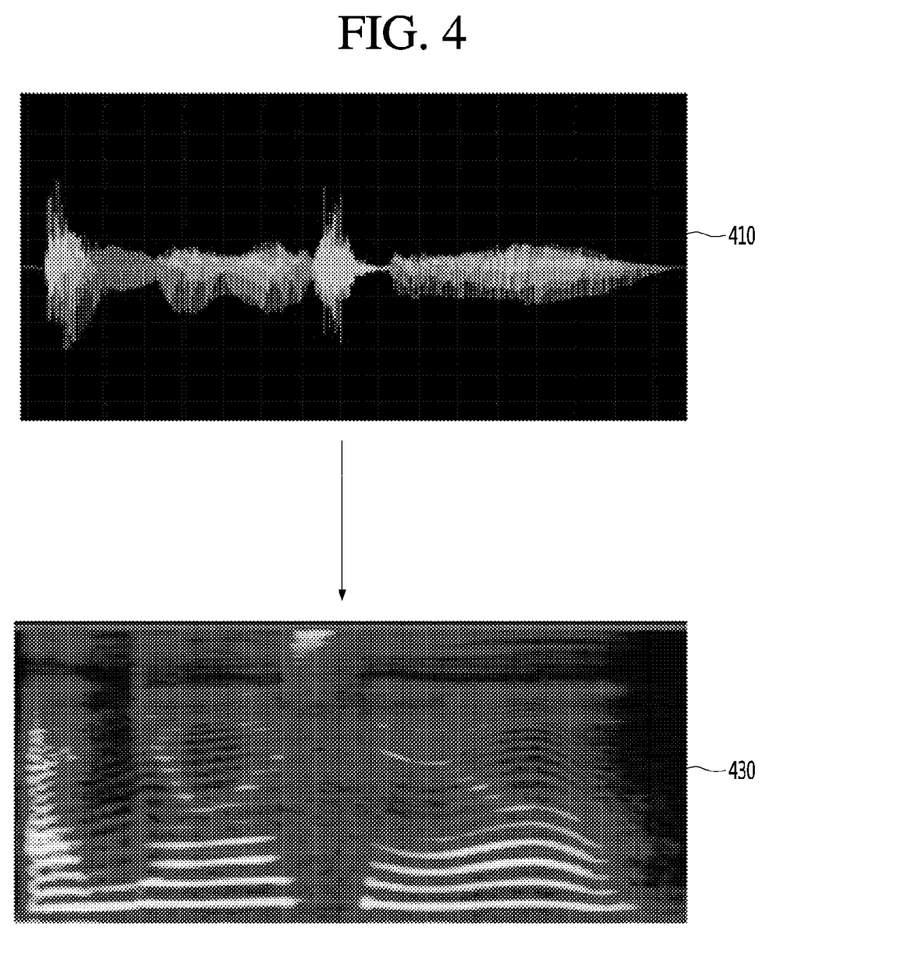
FIG. 4 is a diagram illustrating an example of converting a speech signal into a power spectrum according to an embodiment of the present invention.

FIG. 4 is a diagram illustrating an example of converting a speech signal into a power spectrum according to an embodiment of the present invention.

Referring to FIG. 4, the speech signal 410 is shown. The speech signal 410 may be received through the microphone 122 or prestored in the memory 170.

The x-axis of the speech signal 410 denotes a time and the y-axis denotes an amplitude.

The audio processor 181 may convert the speech signal 410, the x-axis of which is a time axis, into a power spectrum 430, the x-axis of which is a frequency axis.

The audio processor 181 may convert the speech signal 410 into the power spectrum 430 using Fast Fourier transform (FFT).

The x-axis of the power spectrum 430 denotes a frequency and the y-axis of the power spectrum 430 denotes a squared value of an amplitude.

FIG. 3 will be described again.

The processor 180 may determine utterance features of a user using at least one of the power spectrum 430 or the text data received from the audio processor 181.

The utterance features of the user may include the gender of the user, the pitch of the user, the tone of the user, the topic uttered by the user, the utterance speed of the user, the volume of the user's voice, etc.

The processor 180 may acquire the frequency of the speech signal 410 and the amplitude corresponding to the frequency using the power spectrum 430.

The processor 180 may determine the gender of the user who utters a speech, using the frequency band of the power spectrum 430.

For example, the processor 180 may determine the gender of the user as a male when the frequency band of the power spectrum 430 is within a predetermined first frequency band range.

The processor 180 may determine the gender of the user as a female when the frequency band of the power spectrum 430 is within a predetermined second frequency band range.

Here, the second frequency band range may be larger than the first frequency band range.

The processor 180 may determine the pitch of the speech using the frequency band of the power spectrum 430.

For example, the processor 180 may determine the pitch of the speech according to the amplitude within a specific frequency band range.

The processor 180 may determine the tone of the user using the frequency band of the power spectrum 430. For example, the processor 180 may determine a frequency band having a certain amplitude or more among the frequency bands of the power spectrum 430 as a main register of the user and determines the determined main register as the tone of the user.

The processor 180 may determine the utterance speed of the user through the number of syllables uttered per unit time from the converted text data.

The processor 180 may determine the topic uttered by the user using a Bag-Of-Word Model scheme with respect to the converted text data.

The Bag-Of-Word Model scheme refers to a scheme for extracting mainly used words based on the frequency of words in a sentence. Specifically, the Bag-Of-Word Model scheme refers to a scheme for extracting unique words from a sentence, expressing the frequency of the extracted words by a vector and determining the uttered topic as a feature.

For example, when words <running>, <physical strength>, etc. frequently appears in the text data, the processor 180 may classify the topic uttered by the user into an exercise.

The processor 180 may determine the topic uttered by the user from the text data using a known text categorization scheme. The processor 180 may extract keywords from the text data and determine the topic uttered by the user.

The processor 180 may determine the volume of user's voice in consideration of the amplitude information in an entire frequency band.

For example, the processor 180 may determine the volume of user's voice based on an average or weighted average of amplitudes in each frequency band of the power spectrum.

The functions of the audio processor 181 and the processor 180 described with reference to FIGS. 3 and 4 may be performed in any one of the NLP server 20 or the speech synthesis server 30.

For example, the NLP server 20 may extract the power spectrum using the speech signal and determine the utterance features of the user using the extracted power spectrum.

Figure 5:
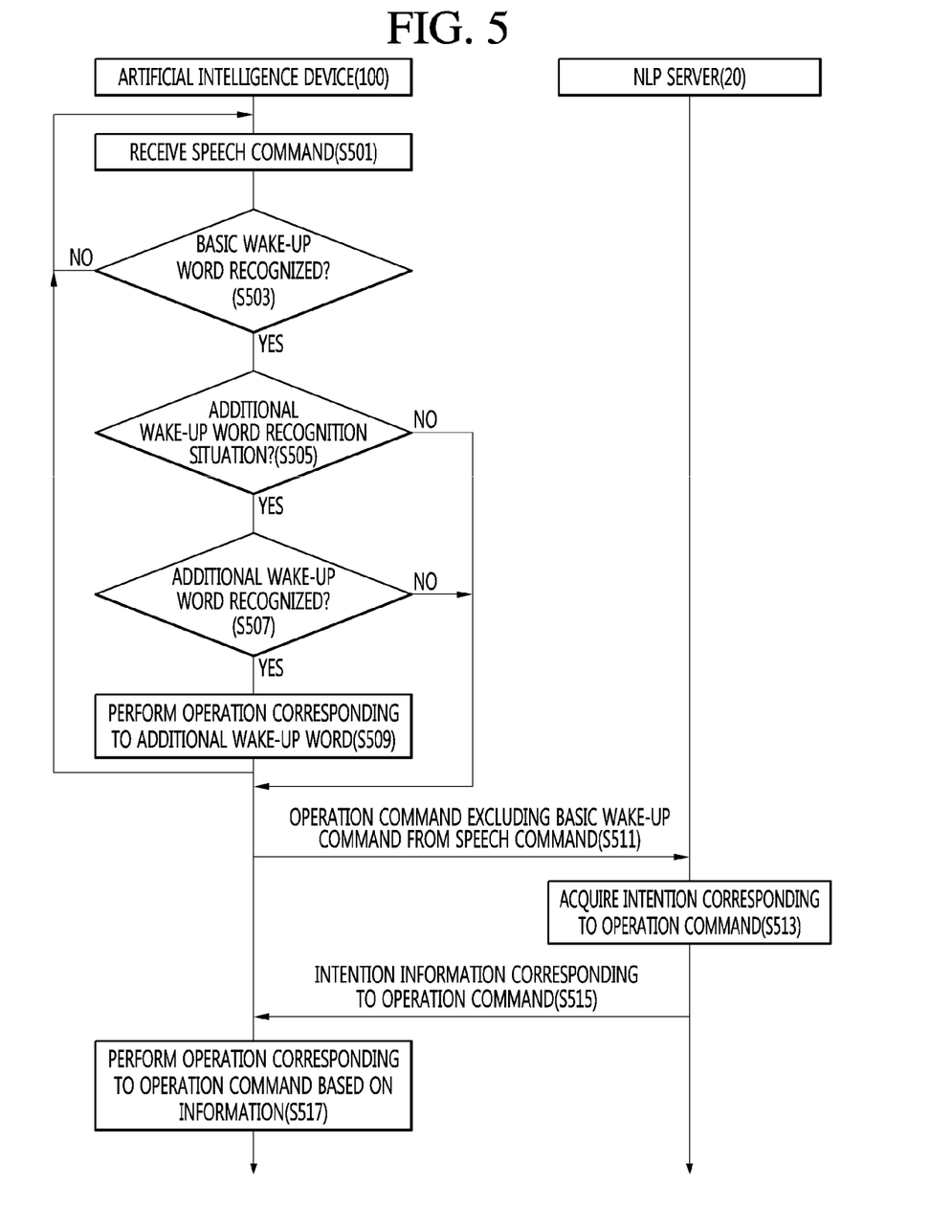
FIG. 5 is a ladder diagram illustrating a method of operating an artificial intelligence system according to an embodiment of the present invention.

FIG. 5 is a ladder diagram illustrating a method of operating an artificial intelligence system according to an embodiment of the present invention.

The artificial intelligence system according to the embodiment of the present invention may include an artificial intelligence device 100 and an NLP server 20.

The microphone 122 of the artificial intelligence device 100 receives a speech command of a user (S501).

For example, the speech command may include a basic wake-up word and an additional wake-up word.

The basic wake-up word may be a command for activating the speech recognition function provided by the artificial intelligence device 100. The basic wake-up word may be prestored in the memory 170 of the artificial intelligence device 100.

The processor 180 of the artificial intelligence device 100 may activate the speech recognition function of the artificial intelligence device 100 and wait for reception of the additional speech command of the user, when the basic wake-up word is recognized.

The additional wake-up word may be a command for performing a specific function of the artificial intelligence device 100 without interworking with the NLP server 20 in a specific situation, in addition to the basic wake-up word.

The additional wake-up word may also be prestored in the memory 170 of the artificial intelligence device 100. The memory 170 may store the additional wake-up word and specific operation information corresponding to the additional wake-up word.

In another example, the speech command may include a basic wake-up word and an operation command.

As described above, the basic wake-up word may be a command for activating the speech recognition function provided by the artificial intelligence device 100.

The operation command may be a command for enabling the artificial intelligence device 100 to perform specific operation through interworking with the NLP server 20. That is, the operation command may not be prestored in the memory 170, unlike the additional wake-up word.

The operation command may be transmitted to the NLP server 20 for performing intention analysis.

The processor 180 of the artificial intelligence device 100 determines whether the basic wake-up word is recognized based on the received speech command (S503).

The processor 180 may recognize the basic wake-up word from the speech command using a word unit recognition model.

The word unit recognition model may be a model for recognizing the speech command in word units.

Specifically, the word unit recognition model may be a model for mapping time sequences (or time slots) of a speech signal corresponding to the speech command to a specific word.

In addition, the word unit recognition model may be a Hidden Markov Model (HMM). The HMM may be a pattern recognition model for matching the pattern of a speech signal to a specific phoneme or word.

The HMM may be learned through a machine learning algorithm or a deep learning algorithm.

The processor 190 may recognize a word corresponding to the basic wake-up word using the word unit recognition model.

The processor 180 of the artificial intelligence device 100 determines whether a current situation is an additional wake-up word recognition situation, when the basic wake-up word is recognized (S505).

The processor 180 may activate the speech recognition function of the artificial intelligence device 100 when the basic wake-up word is recognized from the speech command.

At this same time, the processor 180 may determine whether the current situation is the additional wake-up word recognition situation based on sensing information acquired through the sensing unit 140 of the artificial intelligence device 100.

The additional wake-up word recognition situation may indicate a situation in which the additional wake-up word is recognized without interworking with the NLP server 20 to immediately perform a function corresponding thereto.

For example, when the artificial intelligence device 100 is a refrigerator and a user is detected through a proximity sensor included in the sensing unit 140, it may be determined that the current situation is the additional wake-up word recognition situation.

In another example, when the artificial intelligence device 100 is a water purifier and the water purifier is dispensing water, the processor 180 may determine that the current situation is the additional wake-up word recognition situation.

Meanwhile, the processor 180 may collect information on the current situation of the artificial intelligence device 100 through the sensing unit 140 in real time or periodically, even before the basic wake-up word is recognized.

When the current situation is the additional wake-up word recognition situation, the processor 180 of the artificial intelligence device 100 determines whether the additional wake-up word is recognized based on the speech command (S507).

The processor 180 may determine whether the additional wake-up word is recognized from the speech command, using the word unit recognition model.

That is, the processor 180 may recognize the basic wake-up word from the speech command using the word unit recognition model and then determine whether the remaining command excluding the wake-up word is the additional wake-up word again using the word unit recognition model.

Meanwhile, according to another embodiment, the order of steps S505 and S507 may be reversed. That is, when the additional wake-up word is recognized, the processor 180 may determine that the current situation is the additional wake-up word recognition situation.

A process of recognizing the additional wake-up word will be described with reference to the following drawings.

Figure 6:
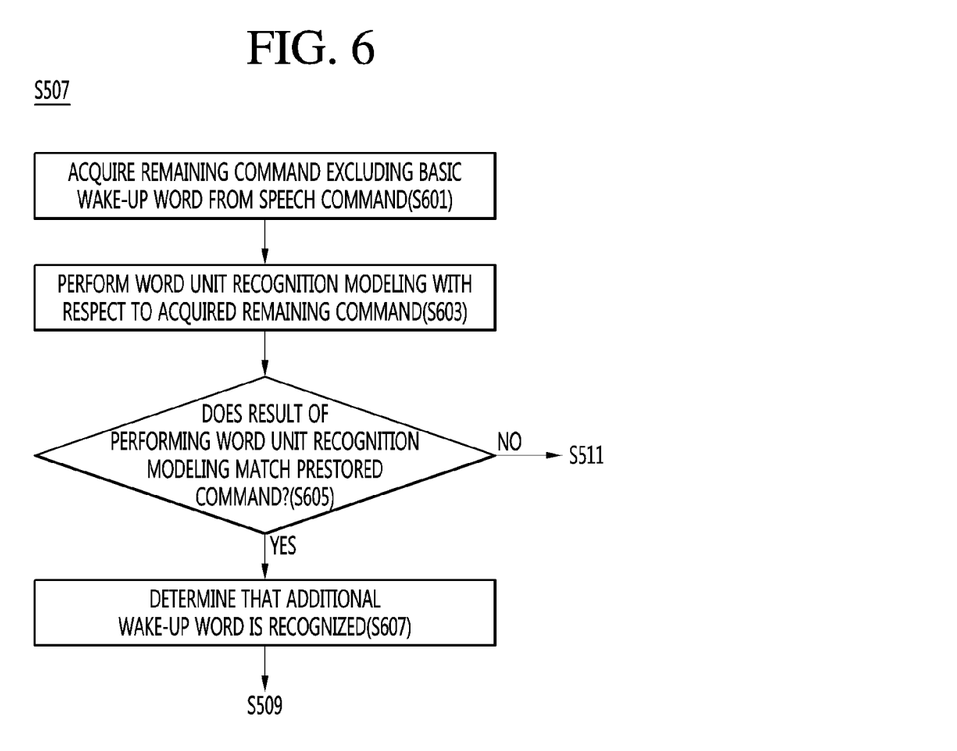
FIG. 6 is a flowchart illustrating a process of recognizing an additional wake-up word according to an embodiment of the present invention.

FIG. 6 is a flowchart illustrating a process of recognizing an additional wake-up word according to an embodiment of the present invention.

Referring to FIG. 6, the processor 180 acquires the remaining command excluding the basic wake-up word from the speech command (S601).

The processor 180 performs the word unit recognition modeling with respect to the acquired remaining command (S603).

The processor 180 may recognize the remaining command excluding the wake-up word using the word unit recognition model.

The processor 180 may acquire a word or a combination (sentence) of words, which is text data mapped to the remaining command using the word unit recognition model.

The processor 180 determines whether a result of performing the word unit recognition modeling matches a command prestored in the memory 170 (S605).

The processor 180 may determine whether the word acquired using the word unit recognition model matches the word stored in the memory 170.

The processor 180 may determine whether the acquired sentence matches a sentence stored in the memory 170 using the word unit recognition model.

The command stored in the memory 170 may vary according to the type of the artificial intelligence device 100. For example, the command prestored in the memory 170 may be <stop> when the artificial intelligence device 100 is a water purifier, and the command stored in the memory 170 may be <open the door> when the artificial intelligence device 100 is a refrigerator.

When the result of performing the word unit recognition modeling matches the prestored command, the processor 180 determines that the additional wake-up word is recognized (S607).

The processor 180 performs step S509 after recognizing the additional wake-up word.

When the result of performing the word unit recognition modeling does not match the prestored command, the processor 180 performs step S511.

FIG. 5 will be described again.

When the additional wake-up word is recognized, the processor 180 of the artificial intelligence device 100 performs operation corresponding to the additional wake-up word (S509).

For example, when the artificial intelligence device 100 is a water purifier and the additional wake-up word is <stop>, the processor 180 may stop water dispensing of the water purifier.

In another example, when the artificial intelligence device 100 is a refrigerator and the additional wake-up word is <open the door>, the processor 180 may open the door of the refrigerator.

Meanwhile, upon determining that the current situation is not the additional wake-up word recognition situation or when the current situation is the additional wake-up word recognition situation but the additional wake-up word is not recognized, the processor 180 of the artificial intelligence device 100 transmits the operation command excluding the basic wake-up word from the speech command to the NLP server 20 (S511).

The processor 180 may transmit the operation command which is not recognized as the additional wake-up word excluding the basic wake-up word to the NLP server 20 through the wireless communication unit 110.

Here, the wireless communication unit 110 may be the wireless Internet module 113 of FIG. 1.

The NLP server 20 analyzes the intention of the operation command received from the artificial intelligence device 100 and acquires the intention corresponding to the operation command (S513).

The NLP server 20 transmits intention information including the acquired intention to the artificial intelligence device 100 (S515).

The wireless Internet module 113 of the artificial intelligence device 100 may receive the intention information indicating the intention corresponding to the operation command from the NLP server 20.

The intention information may be text data indicating the intention corresponding to the operation command.

The processor 180 of the artificial intelligence device 100 performs operation corresponding to the operation command based on the intention information received from the NLP server 20 (S517).

For example, when the artificial intelligence device 100 is a TV and the operation command is <what time is now>, the processor 180 may output a current time through the display 151 or the sound output unit 152.

Figure 7:
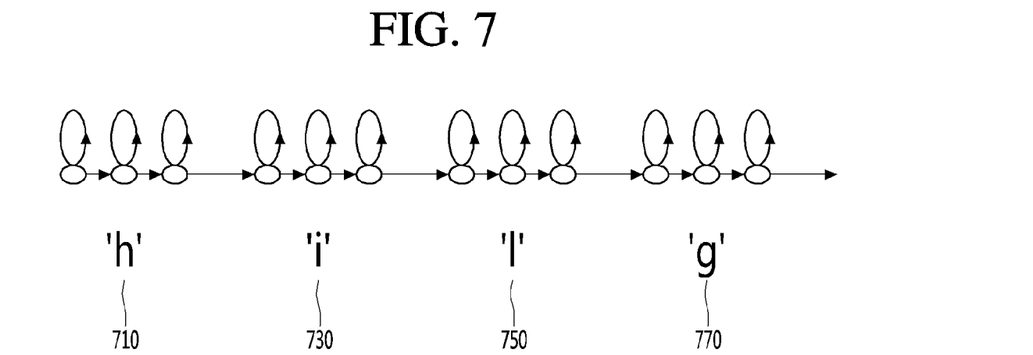
FIG. 7 is a diagram illustrating a process of performing phoneme unit recognition modeling with respect to a speech command.
Figure 8:
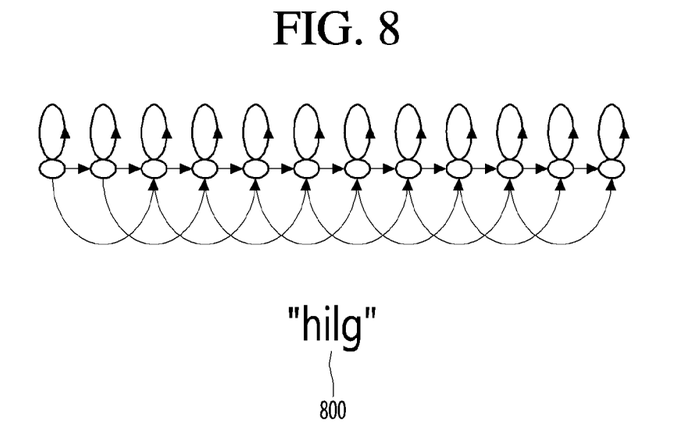
FIG. 8 is a diagram illustrating a process of performing word unit recognition modeling with a speech command.
Figure 9:
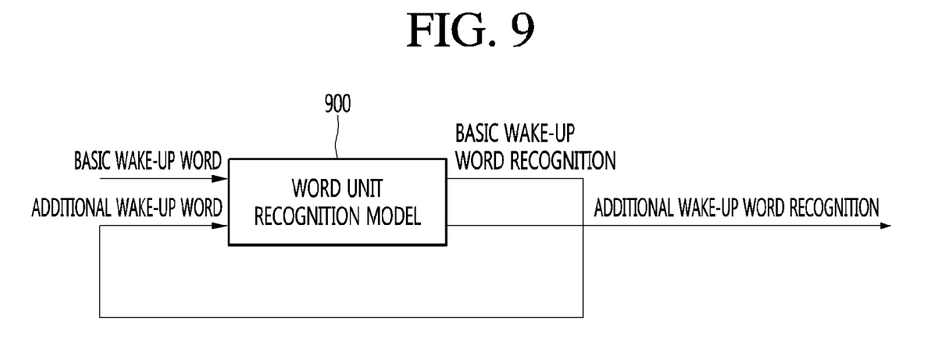
FIG. 9 is a diagram illustrating a process of continuously performing word unit recognition modeling with respect to a wake-up word and the remaining command of a speech command according to an embodiment of the present invention.

FIG. 7 is a diagram illustrating a process of performing phoneme unit recognition modeling with respect to a speech command, FIG. 8 is a diagram illustrating a process of performing word unit recognition modeling with a speech command, and FIG. 9 is a diagram illustrating a process of continuously performing word unit recognition modeling with respect to a wake-up word and the remaining command of a speech command according to an embodiment of the present invention.

First, FIG. 7 will be described.

FIG. 7 is a diagram illustrating a process of mapping a speech command <hilg> to phoneme units h 710, I 730, l 750 and g 770 using a phoneme unit recognition model.

The phoneme unit recognition model may be a model for recognizing the speech command in phoneme unit. Specifically, the phoneme unit recognition model may be a model for dividing the speech signal corresponding to the speech command into a plurality of time slots and mapping each of the plurality of time slots to a specific phoneme.

The processor 180 may divide the speech signal corresponding to <hilg> into a plurality of time slots having a first unit time interval and mapping a partial speech signal corresponding to each of the plurality of time slots to each phoneme, using the phoneme unit recognition model.

The phoneme unit recognition model may be a Hidden Markov Model.

FIG. 8 is a diagram illustrating a process of mapping the speech command <hilg> 800 to word units hi and lg or a combination hilg of words using the word unit recognition model.

The processor 1900 may map the speech signal corresponding to <hilg> 800 to a specific word <hilg> using the word unit recognition model.

The phoneme unit recognition model is advantageous in that combinations of various phonemes is easy, but is disadvantages in that accuracy of the modeling result of each phoneme is affected by modeling of the following phonemes.

The word unit recognition model is advantageous in that accuracy of modeling of an individual phoneme is less affected and the whole speech signal is modeled by one word or a combination of words and thus modeling is easy. However, the word unit recognition model is disadvantageous in that new learning is necessary to map, to a new word, a speech signal corresponding to a new word.

FIG. 9 is a diagram illustrating a process of applying the word unit recognition model to the speech command in series to model the speech command, by combining the advantages of the phoneme unit recognition model and the word unit recognition model.

In FIG. 9, assume that the speech command is composed of the basic wake-up word and the additional wake-up word following the basic wake-up word.

First, the processor 180 may recognize the basic wake-up word using the word unit recognition model. The word unit recognition model 900 may map the speech signal of the basic wake-up word to a first word and output a mapping result. The mapping result may be first text data corresponding to the first word.

Thereafter, the remaining additional wake-up word excluding the basic wake-up word may be sequentially input to the word unit recognition model 900. The processor 180 may map a speech signal corresponding to the additional wake-up word to a second word using the word unit recognition model 900 and output a mapping result, using the word unit recognition model 900. The mapping result may be second text data corresponding to the second word.

Figure 10:
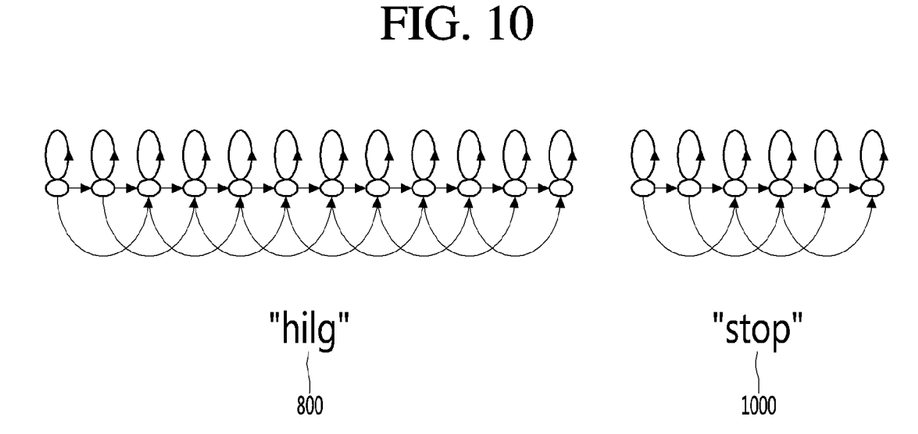
FIG. 10 is a diagram illustrating a process of applying a word unit recognition model to a speech command in series according to an embodiment of the present invention.

FIG. 10 is a diagram illustrating a process of applying a word unit recognition model to a speech command in series according to an embodiment of the present invention.

Referring to FIG. 10, assume that the speech command is composed of the basic wake-up word 800<hilg> and the additional wake-up word 1000<stop>.

First, the processor 180 may perform word unit recognition modeling with respect to the input basic wake-up word 800 and map the first word corresponding to the basic wake-up word 800.

When the first word corresponds to the prestored basic wake-up word, the processor 180 may determine that the basic wake-up word 800 is recognized.

Thereafter, the processor 180 may perform the word unit recognition modeling again with respect to the sequentially input and map the second word corresponding to the additional wake-up word 1000.

When the second word corresponds to the prestored additional wake-up word, the processor 180 may determine that the additional wake-up word 1000 is recognized.

According to the embodiment of the present invention, as the word unit recognition model is applied in series, the advantages of the phoneme unit recognition model and the advantages of the word unit recognition model are combined.

Therefore, it is possible to efficiently use the memory 170 and to improve speech recognition performance.

Figure 11:
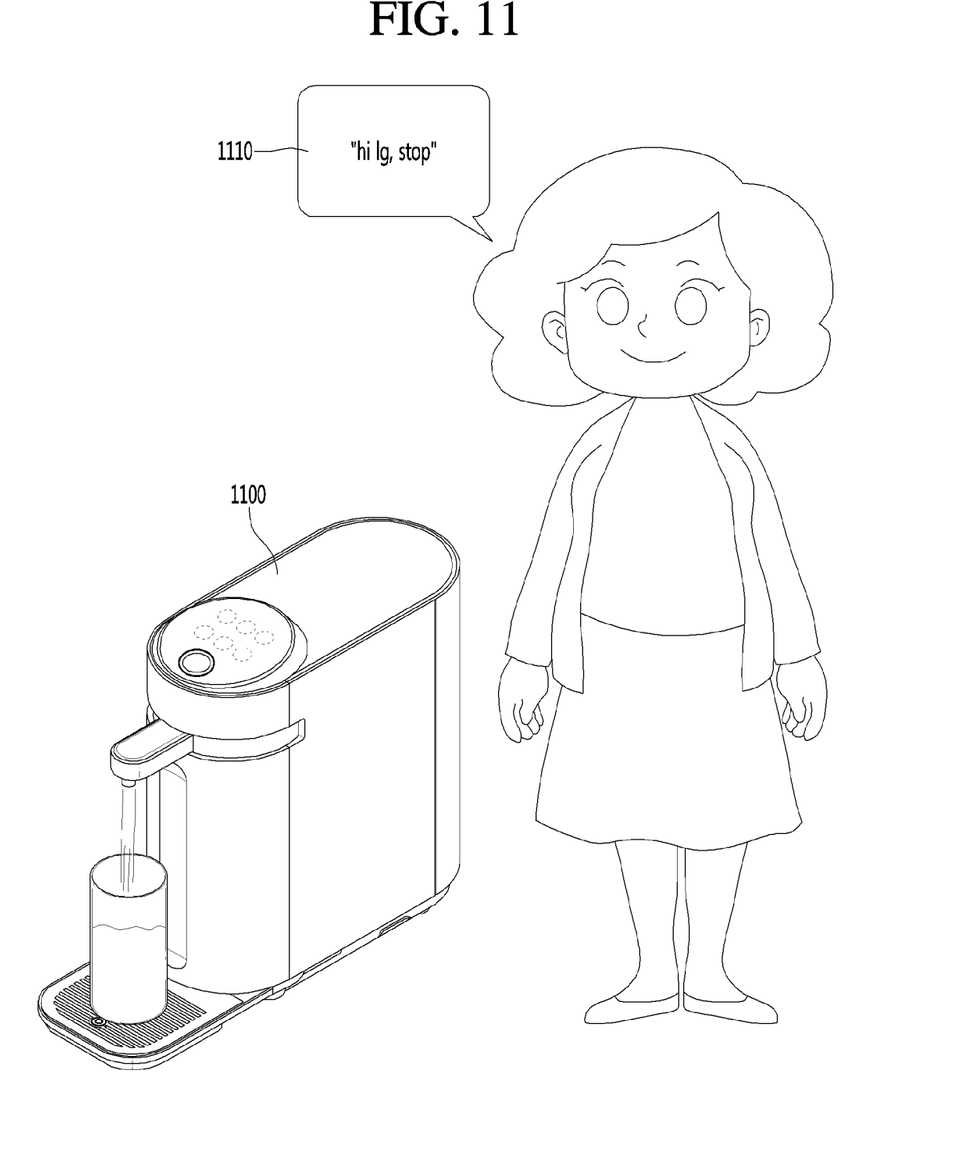
FIGS. 11 and 12 are diagrams illustrating scenarios in which an artificial intelligence device is controlled using a speech command including a basic wake-up word and an additional wake-up word according to an embodiment of the present invention.
Figure 12:
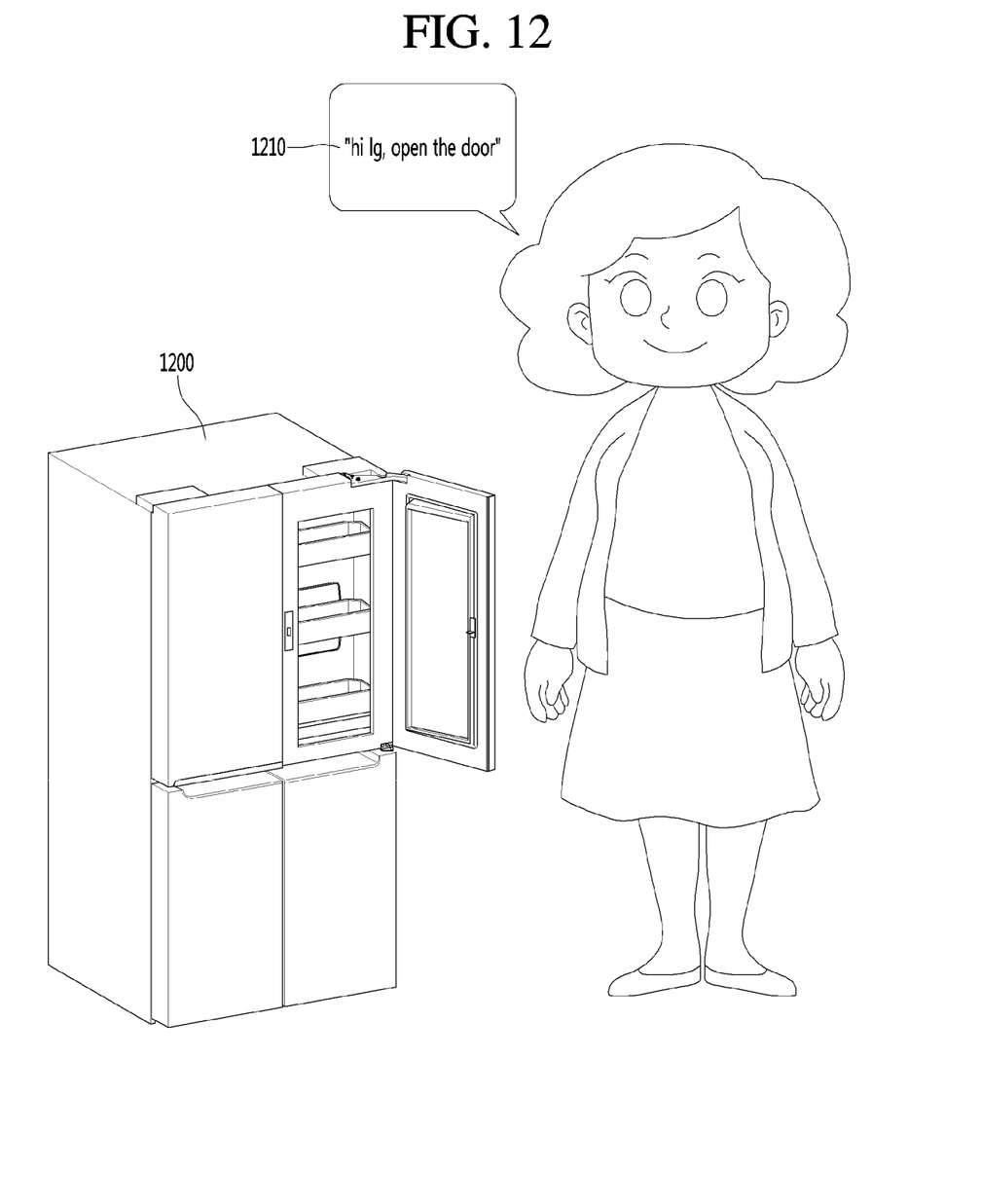

FIGS. 11 and 12 are diagrams illustrating scenarios in which an artificial intelligence device is controlled using a speech command including a basic wake-up word and an additional wake-up word according to an embodiment of the present invention.

In FIG. 11, assume that the artificial intelligence device 100 is a water purifier. In FIG. 12, assume that the artificial intelligence device 100 is a refrigerator.

First, FIG. 11 will be described.

Referring to FIG. 11, the water purifier is dispensing water to a cup.

In this situation, the user speaks a speech command 1110 <hilg stop>.

The water purifier may recognize the basic wake-up word <hilg> from the speech command 1110 using the word unit recognition model.

The water purifier may recognize the remaining command <stop> using the word unit recognition model, after recognizing the basic wake-up word <hilg>.

The water purifier may determine whether the recognized remaining command <stop> corresponds to the prestored additional wake-up word.

Upon determining that the remaining command <stop> corresponds to the prestored additional wake-up word, the water purifier may determine whether the current situation is the additional wake-up word recognition situation.

When the water purifier is dispensing water, it may be determined that the current situation is the additional wake-up word recognition situation.

In another example, when the user is detected through the proximity sensor, the water purifier may determine that the current situation is the additional wake-up word recognition situation.

In another example, when a cup is detected through a pressure sensor, the water purifier may determine that the current situation is the additional wake-up word recognition situation.

When the current situation is the additional wake-up word recognition situation, the water purifier may perform operation corresponding to the additional wake-up word. That is, the water purifier may stop water dispensing as operation corresponding to the additional wake-up word <stop>.

As the wake-up word having the extended concept is used in a specific situation, it is not necessary to transmit the operation command excluding the basic wake-up word to the NLP server 20 for intention analysis. Accordingly, it is possible to improve a speech recognition rate without delay.

In addition, since only some operation commands recognized as the additional wake-up word are stored in the memory 170 instead of all operation commands, it is possible to reduce the burden on the storage capacity of the memory 170.

Next, FIG. 12 will be described.

Assume that a user is close to the front surface of the refrigerator.

In this situation, the user speaks a speech command 1210 <hilg open the door>. The refrigerator may recognize the basic wake-up word <hilg> from the speech command 1210 using the word unit recognition model.

The refrigerator may recognize the remaining command <open the door> using the word unit recognition model, after recognizing the basic wake-up word <hilg>.

The refrigerator may determine whether the remaining command <open the door> corresponds to the additional wake-up word stored in the memory 170.

Upon determining that <open the door> corresponds to the additional wake-up word stored in the memory 170, the refrigerator may determine whether the current situation is the additional wake-up word recognition situation.

When the user is detected through the proximity sensor, the refrigerator may determine that the current situation is the additional wake-up word recognition situation.

In another example, upon determining that the user is detected based on an image captured by a camera provided in the refrigerator, the refrigerator may determine that the current situation is the additional wake-up word recognition situation.

When the current situation is the additional wake-up word recognition situation, the refrigerator may perform operation corresponding to the additional wake-up word recognition situation. That is, the refrigerator may automatically open the door of the refrigerator as operation corresponding to the additional wake-up word <open the door>.

As the additional wake-up word as well as the basic wake-up word is used for speech recognition in a specific situation, it is not necessary to transmit the operation command to the NLP server 20. Therefore, the artificial intelligence device 100 can immediately perform the operation through speech recognition without delay.

In addition, it is not necessary to store commands for controlling all operations of the artificial intelligence device 100 in the memory 170, thereby efficiently using the memory 170.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. An artificial intelligence device for providing a speech recognition function, the artificial intelligence device comprising:
   a proximity sensor;
   a memory configured to store a basic wake-up word used to activate the speech recognition function of the artificial intelligence device and an additional wake-up word used to control operation of the artificial intelligence device;
   a microphone configured to receive a speech command; and
   a processor configured to:
   determine whether a current situation is an additional wake-up word recognition situation when the basic wake-up word is recognized from the speech command, and perform an operation corresponding to a remaining command excluding the basic wake-up word from the speech command upon determining that the current situation is the additional wake-up word recognition situation, wherein the processor is further configured to determine that the additional wake-up word recognition situation is detected after the basic wake-up word is recognized when a user is detected by using the proximity sensor or when the artificial intelligence device performs a specific operation.

2. The artificial intelligence device according to claim 1, wherein the processor performs operation corresponding to the additional wake-up word when the remaining command matches the additional wake-up word stored in the memory.

3. The artificial intelligence device according to claim 2, wherein the processor recognizes the basic wake-up word using a word unit recognition model stored in the memory and recognizes the remaining command using the word unit recognition model after recognizing the basic wake-up word.

4. The artificial intelligence device according to claim 3, wherein the word unit recognition model is a model for a speech signal corresponding to the speech command to a specific word, and is learned through a deep learning algorithm or a machine learning algorithm.

5. The artificial intelligence device according to claim 3, wherein the processor performs operation corresponding to the additional wake-up word, upon determining that the remaining command matches the additional wake-up word stored in the memory and the current situation is the additional wake-up word recognition situation.

6. The artificial intelligence device according to claim 1, further comprising a wireless communication unit configured to communicate with a natural language processing (NLP) server for performing intention analysis, wherein the processor transmits the remaining command to the NLP server when the remaining command does not match the additional wake-up word.

7. A method of operating an artificial intelligence device for providing a speech recognition function, the method comprising:

storing a basic wake-up word used to activate the speech recognition function of the artificial intelligence device and an additional wake-up word used to control operation of the artificial intelligence device;

receiving a speech command;

determining whether a current situation is an additional wake-up word recognition situation when the basic wake-up word is recognized from the speech command; and performing an operation corresponding to a remaining command excluding the basic wake-up word from the speech command, upon determining that the current situation is the additional wake-up word recognition situation, wherein the determining of whether the current situation is the additional wake-up word recognition situation comprises:

determining that the additional wake-up word recognition situation is detected after the basic wake-up word is recognized when a user is detected by using a proximity sensor or when the artificial intelligence device performs a specific operation.

8. The method according to claim 7, wherein the performing of the operation includes performing operation corresponding to the additional wake-up word when the remaining command matches the additional wake-up word stored in a memory.

9. The method according to claim 8, further comprising:

recognizing the basic wake-up word using a word unit recognition model stored in a memory; and recognizing the remaining command using the word unit recognition model after recognizing the basic wake-up word, wherein the word unit recognition model is a model for a speech signal corresponding to the speech command to a specific word, and is learned through a deep learning algorithm or a machine learning algorithm.

10. The method according to claim 9, wherein the performing of the operation includes performing operation corresponding to the additional wake-up word, upon determining that the remaining command matches the additional wake-up word stored in the memory and the current situation is the additional wake-up word recognition situation.

11. The method according to claim 7, further comprising transmitting the remaining command to a natural language processing (NLP) server when the remaining command does not match the additional wake-up word.

* * * * *